United States Patent
Fujiwaka

(10) Patent No.: US 9,529,688 B2
(45) Date of Patent: Dec. 27, 2016

(54) PERFORMANCE EVALUATION DEVICE AND PERFORMANCE EVALUATION METHOD

(75) Inventor: Masaya Fujiwaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 770 days.

(21) Appl. No.: 13/978,412

(22) PCT Filed: Dec. 28, 2011

(86) PCT No.: PCT/JP2011/007343
§ 371 (c)(1),
(2), (4) Date: Jul. 5, 2013

(87) PCT Pub. No.: WO2012/093469
PCT Pub. Date: Jul. 12, 2012

(65) Prior Publication Data
US 2013/0282337 A1    Oct. 24, 2013

(30) Foreign Application Priority Data
Jan. 6, 2011   (JP) .................. 2011-001467

(51) Int. Cl.
*G06F 11/34* (2006.01)

(52) U.S. Cl.
CPC ....... *G06F 11/3414* (2013.01); *G06F 11/3447* (2013.01)

(58) Field of Classification Search
CPC .............. G06F 11/3447; G06F 11/3414; G06F 11/3457; G06F 9/5094; G06F 9/505; H04L 41/147; H04L 67/10
See application file for complete search history.

(56) References Cited

U.S. PATENT DOCUMENTS

| | | |
|---|---|---|
| 2007/0283009 A1 | 12/2007 | Takemura |
| 2009/0070771 A1* | 3/2009 | Yuyitung ............... G06Q 10/06 718/105 |

(Continued)

FOREIGN PATENT DOCUMENTS

| | | |
|---|---|---|
| JP | 3987333 B2 | 10/2007 |
| JP | 2007-323245 A | 12/2007 |
| JP | 2009-123174 A | 6/2009 |

OTHER PUBLICATIONS

Mitsuru Yanagisawa et al., "Proposal of method of estimating load of virtual server using performance characteristic information", Dai 72 Kai (Heisei 22 Nen) Zenkoku Taikai Koen Ronbunshu (1), Information Processing Society of Japan, Mar. 2010, pp. 1-291-1-292.

(Continued)

*Primary Examiner* — Kim T Nguyen
(74) *Attorney, Agent, or Firm* — Sughrue Mion, PLLC

(57) ABSTRACT

A performance evaluation device includes: a workload controlling unit that sequentially generates, for each of plural single workload types, plural workloads having different sizes on an evaluation target computer, and sequentially generates, for a combined workload type formed by combining at least two different single workload types, plural combined workloads on the evaluation target computer; a data acquiring unit that acquires primary performance data on each of currently running workloads and combined performance data on each of currently running combined workloads; a data analyzing unit that models the acquired primary performance data to generate a primary performance model corresponding to each of the single workload types; and a model generating unit that generates a combined performance model corresponding to a combined (Continued)

workload type on the basis of the combined performance data and the primary performance model.

15 Claims, 8 Drawing Sheets

(56) References Cited

U.S. PATENT DOCUMENTS

2009/0089554 A1* 4/2009 Blackmon .......... G06F 11/3428
  712/220
2009/0133018 A1 5/2009 Kaneki

OTHER PUBLICATIONS

International Search Report for PCT/JP2011/007343 dated Feb. 14, 2012.

* cited by examiner

FIG. 4

SINGLE WORKLOAD TYPE: CPU
NUMBER OF DIVISIONS: 20
RUNNING TIME: 60 SECONDS
W_Thres_CPU

FIG. 5

```
SINGLE WORKLOAD TYPE: NETWORK TRANSMISSION
NUMBER OF DIVISIONS: 20
RUNNING TIME: 60 SECONDS
COMMUNICATION DESTINATION ADDRESS: SERVER01
W_Thres_NWSEND
```

FIG. 6

| COMBINED WORKLOAD TYPE: |
| CPU, NETWORK TRANSMISSION |
| NUMBER OF DIVISIOS: 10 |
| RUNNING TIME: 60 SECONDS |
| COMMUNICATION DESTINATION ADDRESS: SERVER01 |
| W_thres_CPU、W_Thres_NWSEND |

PERFORMANCE EVALUATION DEVICE AND PERFORMANCE EVALUATION METHOD

CROSS REFERENCE TO RELATED APPLICATIONS

This application is a National Stage of International Application No. PCT/JP2011/007343 filed Dec. 28, 2011, claiming priority based on Japanese Patent Application No. 2011-001467 filed Jan. 6, 2011, the contents of all of which are incorporated herein by reference in their entirety.

TECHNICAL FIELD

The present invention relates to a performance evaluation technique for a computer.

BACKGROUND ART

In recent years, virtualization techniques have been progressing and proliferating, which has led to an increase in the numbers of systems that employ virtual machines to realize servers for providing services. This also leads to an increase in the amount of power consumed in data centers for operating server computers that realize the virtual machines, and has resulted in the urgent need for a reduction in the amount of power consumed.

In the virtualized environment, virtual machines operated on different pieces of hardware (computers) are caused to operate on the same hardware, enabling efficient use of resources. Currently, however, the number of the virtual machines operated on the same hardware is extremely limited so as to maintain the service levels for the virtual machines, so that available resources are not fully utilized.

In order to integrate the virtual machines into the reduced amount of hardware while maintaining the levels of the services, it is important to accurately estimate the capacity of the hardware and the capacity necessary for the virtual machines. If this estimation is not accurately made, the amount of hardware needed increases. This is because, to maintain the levels of the service, it is inevitable to estimate the necessary capacity of the virtual machines to be larger, so that the number of the virtual machines to be operated on the same hardware has to be set to be smaller.

Patent Document 1 described below proposes a technique that enables performance tests for an information processing system to be automatically conducted continuously under different measurement conditions. More specifically, Patent Document 1 proposes conducting the performance tests for an information processing system on the basis of data on the performance tests generated by arbitrarily combining setting values for items under different measurement conditions.

RELATED DOCUMENT

Patent Document

Patent Document 1: Japanese Patent No. 3987333

SUMMARY OF THE INVENTION

However, the method described above only conducts the performance tests for each of the items to be measured (for example, for each computer resource), and does not take into consideration performance tests in which multiple items are combined. It is rare to perform one process with one computer resource on a computer (system) under a virtualized environment and other environments, and in practice, it is very common to perform plural processes in parallel.

Thus, there is a possibility that the performance data obtained through the above-described method have reduced accuracy when used in actual operations.

In particular, under the virtualized environment, the configuration of systems and virtual machines can be changed flexibly and plural virtual machines having various characteristics coexist on the same hardware, which makes it extremely difficult to estimate capacities (performances) of the computers.

An object of the present invention is to provide a technique for evaluating performances of computers with high accuracy.

Each aspect of the present invention employs the following configurations to solve the problem described above.

A first aspect of the present invention relates to a performance evaluation device that evaluates performance of an evaluation target computer. The performance evaluation device according to this first aspect includes a workload controlling unit that sequentially generates, for each of plural single workload types, plural workloads having different sizes on an evaluation target computer, and sequentially generates, for a combined workload type formed by combining at least two different single workload types, plural combined workloads formed by combining different types of workloads corresponding to the combined workload type on the evaluation target computer; a data acquiring unit that acquires primary performance data on the evaluation target computer currently running each of the workloads, and combined performance data on the evaluation target computer currently running each of the combined workloads; a data analyzing unit that models the primary performance data acquired by the data acquiring unit to generate a primary performance model corresponding to each of the single workload types; and a model generating unit that generates a combined performance model corresponding to the combined workload type on the basis of the combined performance data acquired by the data acquiring unit and the primary performance model generated by the data analyzing unit.

A second aspect of the present invention relates to a performance evaluation method performed by a computer and evaluating performance of an evaluation target computer. The performance evaluation method according to the second aspect includes: sequentially generating, for each of plural single workload types, plural workloads having different sizes on the evaluation target computer; acquiring primary performance data on the evaluation target computer currently running each of the workloads; sequentially generating, for a combined workload type formed by combining at least two different single workload types, plural combined workloads formed by combining different types of workloads corresponding to the combined workload type on the evaluation target computer; acquiring combined performance data on the evaluation target computer currently running each of the combined workloads; modeling the acquired primary performance data to generate a primary performance model corresponding to each of the single workload types; and generating a combined performance model corresponding to the combined workload type on the basis of the acquired combined performance data and the generated primary performance model.

A third aspect of the present invention relates to a performance evaluation program that causes a computer to realize each of the elements contained in the second aspect of the present invention. Note that, as another aspect of the present invention, a computer-readable storage medium that stores the performance evaluation program according to the third aspect may be possible. This storage medium includes a non-transitory tangible medium.

According each of the aspects, it is possible to provide a technique for evaluating a performance of a computer in a highly accurate manner.

BRIEF DESCRIPTION OF THE DRAWINGS

FIG. 4 is a diagram illustrating an example of a workload plan file with a single workload type being a CPU.

FIG. 5 is a diagram illustrating an example of a workload plan file with a single workload type being a network transmission.

FIG. 6 is a diagram illustrating an example of a workload plan file of a two-dimensional combined workload type.

DESCRIPTION OF EMBODIMENTS

Hereinbelow, a performance evaluation system according to exemplary embodiments of the present invention will be described with reference to the drawings. The exemplary embodiments described below are merely examples, and the present invention is not limited to the configurations of the exemplary embodiments.

First Exemplary Embodiment

Figure 1:
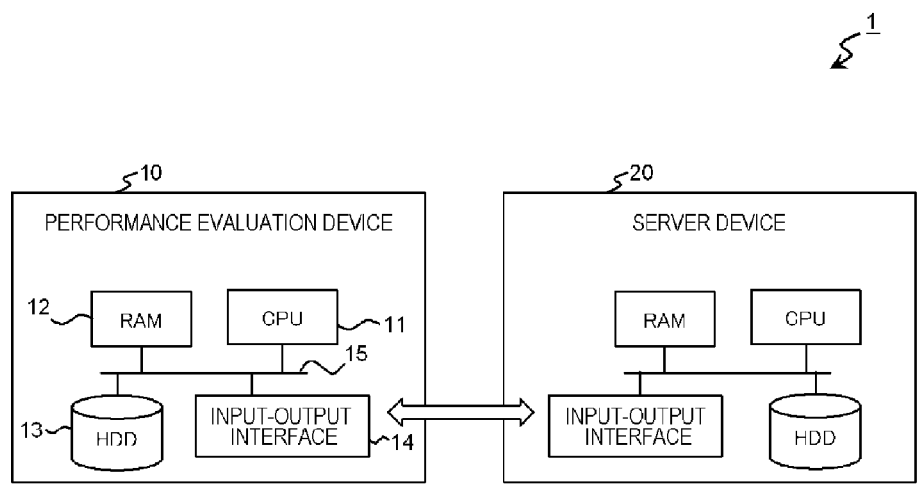
FIG. 1 is a schematic view illustrating an example of a configuration of a performance evaluation system according to a first exemplary embodiment.

FIG. 1 is a schematic view illustrating an example of a configuration of a performance evaluation system according to a first exemplary embodiment. As illustrated in FIG. 1, in the first exemplary embodiment, a performance evaluation system 1 includes a performance evaluation device 10 and a server device 20 serving as a target of the performance evaluation.

In the performance evaluation system 1, the performance evaluation device 10 evaluates a performance of a predetermined computer resource of the server device 20. The performance evaluation device 10 generates a performance model to evaluate the performance of the predetermined computer resource.

As a hardware configuration, the performance evaluation device 10 includes a memory such as a random access memory (RAM) 12, a read only memory (ROM, not illustrated), and a hard disk drive (HDD) 13, a central processing unit (CPU) 11, and an input-output interface 14 and the like. These hardware elements are connected, for example, through a bus 15. The input-output interface 14 includes a network interface that enables communication between the performance evaluation device 10 and the server device 20 in a predetermined form of communication.

The server device 20 has a hardware configuration similar to that of the performance evaluation device 10. In this exemplary embodiment, no limitation is applied to the hardware configurations of the performance evaluation device 10 and the server device 20. Further, in this exemplary embodiment, the computer serving as the target of the performance evaluation is not limited to the server device, and it is only necessary that the target of the performance evaluation is a computer. In the performance evaluation device 10 and the server device 20, the CPU 11 executes a program stored in the memory, thereby realizing the processing units illustrated in FIG. 2, for example.

Figure 2:
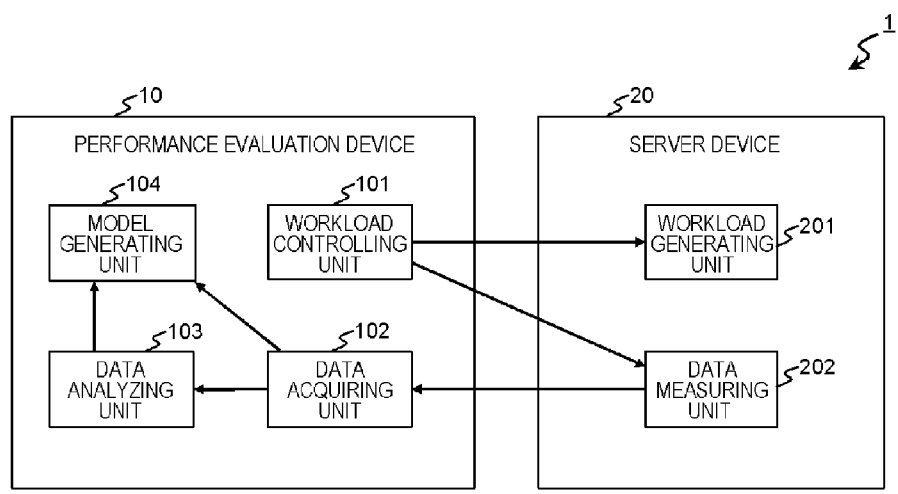
FIG. 2 is a schematic view illustrating an example of a process configuration of a performance evaluation device and a server device according to the first exemplary embodiment.

FIG. 2 is a schematic view illustrating an example of a process configuration of the performance evaluation device 10 and the server device 20 according to the first exemplary embodiment. As illustrated in FIG. 2, the performance evaluation device 10 includes a workload controlling unit 101, a data acquiring unit 102, a data analyzing unit 103, and a model generating unit 104 and the like.

The workload controlling unit 101 sequentially generates, for each of plural single workload types, plural workloads having different sizes on an evaluation target computer, and sequentially generates, for a combined workload type formed by combining at least two different single workload types, plural combined workloads each formed by combining different types of workloads corresponding to the combined workload type on the evaluation target computer.

In this specification, the workload means a load of a process using a certain computer resource, and includes, for example, a CPU load, a network transmission load, a network reception load, a hard disk reading load, a hard disk writing load, and an image processing load and the like. Further, the single workload type means a type of a load of a process (type of workload).

For example, in the case where floating point calculation is employed as the workload related to the CPU, this floating point calculation serves as the type, and corresponds to the single workload type. Further, in the case where a process of displaying a test screen is employed as the workload related to graphics, the process of displaying a test screen serves as the type, and corresponds to the single workload type. In the former case, for the single workload type indicating the floating point calculation, plural floating point calculations having different calculation amounts and calculation loads are prepared, and each of the floating point calculations corresponds to each of the workloads.

The combined workload type represents a type formed by a combination of workload types of two different single workloads processed in parallel on the server device 20 serving as the evaluation target. For example, one combined workload type corresponds to a combination of two different single workload types: a floating point calculation and a network transmission process. In this example, for the combined workload type formed by the floating point calculation and the network transmission process, a combined workload corresponds to a combination of a floating point calculation having a certain calculation amount and a network transmission process having a certain transmission volume.

The data acquiring unit 102 acquires primary performance data on the server device 20 that is currently running each of the workloads, and combined performance data on the server device 20 that is currently running a combined workload. The primary performance data as used herein means data indicating operation states of a predetermined computer resource, and includes, for example, any one, or a combination of any two or more of the following: a percentage of CPU used, an amount of CPU used, a network transmission amount, a network reception amount, a hard-disk reading amount, and a hard-disk writing amount and the like.

The data analyzing unit 103 models the primary performance data acquired by the data acquiring unit 102 to generate a primary performance model for each of the single workload types. In this modeling, for example, a known statistical analysis method is used. This exemplary embodiment does not limit the method for modeling.

The model generating unit 104 generates a combined performance model for the combined workload type on the basis of the combined performance data acquired by the data acquiring unit 102 and each of the primary performance models generated by the data analyzing unit 103. This combined performance model represents characteristics of the performance data on the server device 20 when a combination of at least two workloads corresponding to the combined workload type runs.

The server device 20 includes a workload generating unit 201, and a data measuring unit 202.

With the control performed by the workload controlling unit 101 of the performance evaluation device 10, the workload generating unit 201 runs each of the workloads and the combined workload at timings different from each other. At the time of running the combined workload, the workloads constituting the combined workload are run in parallel.

The workload generating unit 201 may execute a program (task, process, and the like) retained in advance in the server device 20 and corresponding to each of the workloads. Further, it may be possible to employ a configuration in which programs are stored for each of the single workload types, and the workload generating unit 201 applies parameters transmitted from the workload controlling unit 101 to the programs to run them.

The data measuring unit 202 measures each set of the primary performance data during the time when each of the workloads is running, and the combined performance data during the time when the combined workload is running. The primary performance data and the combined performance data measured above are transmitted to the performance evaluation device 10.

[Operation and Effect of First Exemplary Embodiment]

In the first exemplary embodiment, in association with control performed by the performance evaluation device 10, the server device 20 runs workloads, measurement is made of the primary performance data concerning the server device 20 that is currently running the workloads, and the measured primary performance data are transmitted to the performance evaluation device 10. Similarly, in the case where the combined workload runs, combined performance data concerning the server device 20 that is currently running the combined workload are measured, and the measured combined performance data are transmitted to the performance evaluation device 10.

In the performance evaluation device 10, a primary performance model for each single workload type is generated through a modelization of the primary performance data, and a combined performance model for the combined workload type is generated on the basis of the generated primary performance model and the combined performance data.

As described above, according to the first exemplary embodiment, it is possible to generate performance models (combined performance model) under a situation in which plural process loads are running in parallel. Thus, with the first exemplary embodiment, it is possible to accurately evaluate performances of the server device 20 that is actually in operation.

Second Exemplary Embodiment

In a second exemplary embodiment, the performance evaluation system 1 has a configuration similar to that in the above-described first exemplary embodiment illustrated in FIG. 1. Below, the performance evaluation system 1 according to the second exemplary embodiment will be described with focus being placed on things different from those in the first exemplary embodiment.

Figure 3:
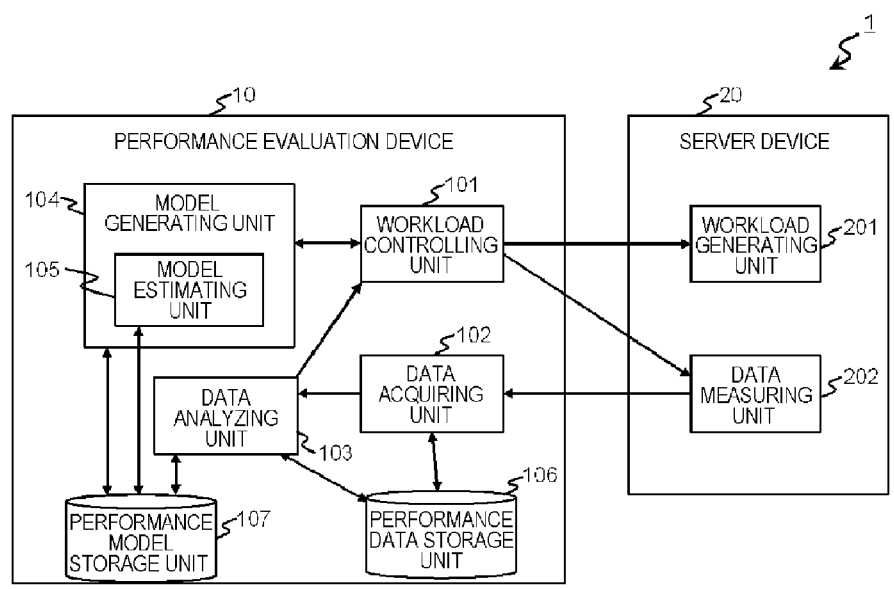
FIG. 3 is a schematic view illustrating an example of a process configuration of a performance evaluation device and a server device according to a second exemplary embodiment.

FIG. 3 is a schematic view illustrating an example of a process configuration of the performance evaluation device 10 and the server device 20 according to the second exemplary embodiment. Note that the server device 20 is similar to that in the first exemplary embodiment, and hence, explanation of the server device 20 will not be repeated in this embodiment.

In addition to the configuration described in the first exemplary embodiment, the performance evaluation device 10 according to the second exemplary embodiment further includes a model estimating unit 105, a performance data storage unit 106, and a performance model storage unit 107. These newly added processing units are realized, for example, by the CPU 11 executing a program stored in the memory. Processing units other than the newly added processing units will also be described with focus being placed on things different from those in the first exemplary embodiment.

When workloads and combined workload are run, the workload controlling unit 101 acquires information on the workloads to be run. This information can be acquired, for example, from workload plan files as illustrated in FIG. 4, FIG. 5, and FIG. 6. These workload plan files may be stored in the performance evaluation device 10, or may be acquired from another device. Each of the workload plan files stores information necessary for running workloads of a single workload type on the server device 20.

FIG. 4 is a diagram illustrating an example of a workload plan file in which the single workload type is the CPU. FIG. 5 is a diagram illustrating an example of a workload plan file in which the single workload type is the network transmission. As illustrated in FIG. 4 and FIG. 5, the workload plan file of the single workload type stores, for example, information for identifying the single workload type, the number of divisions, running time, the upper limit value of the workload (W_Thres_CPU, W_Thres_NWSEND), and an address of communication destination.

The upper limit value of the workload is the minimum value of the workload value with which the maximum performance of the computer resource corresponding to the single workload type can be obtained. For example, the upper limit value of the workload of the single workload type related to the CPU is the minimum workload value with which the percentage of the CPU used is the maximum (for example, 100%). Further, the upper limit value of the workload of the single workload type related to the network transmission is the minimum workload value with which the bit rate is the maximum, for example.

The term "workload value" as used herein represents the size of the workload. For example, in the case where the workload is the floating point calculation, the workload value of the workload may be set to the number of floating point calculations per unit time. Further, in the case where the workload is the network transmission process, the workload value of the workload may be set to the amount of data transmitted per unit time.

In the case where the workload plan files illustrated in FIG. 4 and FIG. 5 are referred to, the workload controlling unit 101 generates, on the server device 20, workloads having workload values (V_CPU(i), V_NWSEND(k)) shown, for example, in Equation 1 and Equation 2 below.

$$V\_CPU(i)=i\times(W\_Thres\_CPU/D) \quad \text{Equation 1}$$

$$V\_NWSEND(k)=k\times(W\_Thres\_NWSEND/D) \quad \text{Equation 2}$$

where D is the number of divisions, and i and k are integers between 0 and the number of divisions (inclusive).

In the case of the examples illustrated in FIG. 4 and FIG. 5, the workload controlling unit 101 causes 21 ($0 \leq i \leq 20$) pieces of workloads having different workload values and concerning a single workload type of the CPU to each run for 60 seconds on the server device 20. Then, the workload controlling unit 101 causes 21 ($0 \leq k \leq 20$) pieces of workload having different workload values and concerning a single workload type of the network transmission to each run for 60 seconds on the server device 20.

The workload controlling unit 101 may generate desired workloads by transmitting, to the server device 20, a workload running instruction containing information for identifying the single workload type, the number of divisions, running time, and the upper limit value of the workload. Further, in the case of the examples illustrated in FIG. 4 and FIG. 5, each of the workload values can be obtained by dividing the upper limit value of the workload by a predetermined number of divisions. However, it may be possible to set a desired number of workload values in advance.

In the case where a program corresponding to the workload to be run on the server device 20 needs to be run on another computer, the workload controlling unit 101 gives an instruction for the other computer to run the program. For example, in the case where a workload related to network reception is caused to run on the server device 20, it is necessary to prepare a program that causes another computer to transmit data to the server device 20. In such a case, the workload controlling unit 101 performs control so as to run a program to transmit data on the other computer, before or at the same time when the workload related to the network reception is caused to run on the server device 20.

The workload controlling unit 101 may give an instruction for the data measuring unit 202 of the server device 20 to start measurement. In this case, the workload controlling unit 101 gives an instruction for the data measuring unit 202 to start the measurement of predetermined performance data before or at the same time when the workload generating unit 201 causes the workload or combined workload to run.

FIG. 6 is a diagram illustrating an example of a workload plan file of a two-dimensional combined workload type. Hereinbelow, a combined workload type is denoted with a K-dimensional combined workload type in accordance with the number (K) of the single workload types constituting the combined workload type. Similarly, a combined workload formed by combining K pieces of the workloads is denoted with a K-dimensional combined workload.

The file illustrated in FIG. 6 contains a workload plan including a two-dimensional combined workload type formed by combining a single workload type related to the CPU and a single workload type related to the network transmission. The workload plan file of the combined workload type contains information for identifying a combined workload type, the number of divisions, running time, an address of communication destination, and the upper limit value of the workload of each of the single workload type constituting the combined workload type.

The workload controlling unit 101 sets the number of the combined workloads running in relation to the combined workload type so as to be less than the number of all the combinations of the workloads running in relation to the single workload types constituting the combined workload type.

In the examples of FIG. 4, FIG. 5, and FIG. 6, the number of workloads running in relation to each of the single workload types of the CPU and the network transmission is 21, whereby the number of all the combinations of these workloads is 441 (=21×21). However, the number of combined workloads running in relation to a combined workload type is a number obtained by subtracting the number (22) of the single workload from the number (121=11×11) of all the combinations of 11 pieces of workloads running in relation to the CPU and 11 pieces of workloads running in relation to the network transmission. Here, the subtracting number (22) is a combination of i=0 or k=0 in Equation 1 and Equation 2 described above, and these are single workloads rather than a combined workload.

After causing the workloads related to the single workload types to run, the workload controlling unit 101 causes the combined workloads to run on the server device 20 in increasing order from the combined workload types having a smaller number of the workload types combined. In the example of FIG. 6, as the two-dimensional combined workload, the workload controlling unit 101 causes workloads indicating V_CPU(i) and V_NWSEND(k), which are obtained by applying the number of divisions D (=10) to Equation 1 and Equation 2 described above, to run on the server device 20 in parallel. At this time, one workload (combination of i=0 or k=0) that has been already running is excluded.

It should be noted that there is no specific limitation applied on the number of the combined workloads running in relation to the combined workload type, provided that this number is less than the number of all the combinations of the workloads running in relation to the single workload types constituting this combined workload type. By reducing the number of combined workloads, this exemplary embodiment reduces the number of measurements and further reduces the time required for the measurement.

The data acquiring unit 102 may acquire performance data corresponding to a type of performance to be evaluated. For example, in the case where evaluation for the CPU performance is finally desired, the data acquiring unit 102 may acquire performance data indicating the CPU performance. Further, in the case where evaluation for the network transmission performance is finally desired, the data acquiring unit 102 may acquire performance data indicating the network transmission performance.

The performance data storage unit 106 stores the performance data acquired by the data acquiring unit 102. The performance model storage unit 107 stores, for example, the primary performance model generated by the data analyzing unit 103, the K-dimensional (K equals 2 or more) performance data generated by the model generating unit 104, and the approximate combined performance model estimated by the model estimating unit 105.

The data stored in the performance data storage unit 106 and the performance model storage unit 107 are extracted as needed, and are used in each of the processing units. In the description after this, when each of the processing units uses data stored in the performance data storage unit 106 and the performance model storage unit 107, no specific description will be made that these data are extracted from the performance data storage unit 106 and the performance model storage unit 107, since it is obvious.

Of the primary performance models generated by the data analyzing unit 103, the model estimating unit 105 uses primary performance models corresponding to each of the single workload types constituting the two-dimensional combined workload type to estimate an approximate combined performance model corresponding to this two-dimensional combined workload type. The model estimating unit 105 estimates the approximate combined performance model, for example, by adding up the primary performance models.

For example, the approximate combined performance model M2CPU_CPU_NWSEND~( ) corresponding to the two-dimensional combined workload type for evaluating the CPU performance can be expressed by the following equation.

$$\text{M2CPU\_CPU\_NWSEND~(WL\_CPU,WL\_NWSEND)} = K(\text{M1CPU\_CPU(WL\_CPU)} + \text{M1CPU\_NWSEND(WL\_NWSEND)})$$

WL_CPU is a variable indicating a workload value of the CPU workload, and WL_NWSEND is a variable indicating a workload value of the network transmission workload. M1CPU_CPU(WL_CPU) is a CPU performance model for a single workload type related to the CPU. M1CPU_NWSEND(WL_NWSEND) is a CPU performance model for a single workload type related to the network transmission. K represents a function that returns the maximum value of the CPU performance in the case where an argument value exceeds the maximum value of the CPU performance.

It should be noted that this estimated approximate combined performance model is obtained by adding up primary performance models, and hence, does not take into consideration any competing elements occurring as a result of two types of workloads being caused to run at the same time. This leads to occurrence of difference between the approximate combined performance model and the actual combined performance model.

In the case where K pieces of single workload types (K is an integer more than or equal to 3) are used, the model estimating unit 105 uses (K−1)-dimensional performance model for (K−1)-dimensional combined workload type generated by the model generating unit 104 and obtained by combining (K−1) pieces of different workload types, to estimate the approximate combined performance model for the K-dimensional combined workload type formed by combining K pieces of different workload types. The model estimating unit 105 generates the approximate combined performance model for this K-dimensional combined workload type, for example, by adding up the (K−1)-dimensional performance models.

Further, an approximate combined performance model M3CPU_CPU_NWSEND_HDDWT~( ) for a three-dimensional combined workload type, for example, for evaluating the CPU performance can be expressed by the following equation.

$$\text{M3CPU\_CPU\_NWSEND\_HDDWT~(WL\_CPU, WL\_NWSEND,WL\_HDDWT)} = K(\text{M2CPU\_CPU\_NWSEND(WL\_CPU/2,WL\_NWSEND/2)} + \text{M2CPU\_CPU\_HDDWT(WL\_CPU/2,WL\_HDDWT/2)} + \text{M2CPU\_NWSEND\_HDDWT(WL\_NWSEND/2,WL\_HDDWT/2)})$$

M2CPU_CPU_NWSEND( ) represents the two-dimensional performance model for the two-dimensional combined workload type formed by the combination of the single workload type related to the CPU and the single workload type related to the network transmission. M2CPU_CPU_HDDWT( ) represents the two-dimensional performance model for the two-dimensional workload type formed by the combination of the single workload type related to the CPU and the single workload type related to writing to hard disk. M2CPU_NWSEND_HDDWT( ) represents the two-dimensional performance model for the two-dimensional combined workload type formed by the combination of the single workload type related to the network transmission and the single workload type related to writing to hard disk. K represents a function that returns the maximum value of the CPU performance in the case where the value of the argument exceeds the maximum value of the CPU performance.

It should be noted that, in M3CPU_CPU_NWSEND_HDDWT~( ) described above, each of the variables (workload values) of the two-dimensional performance models of the two-dimensional combined workload types is divided by 2 in order to reduce performance elements that overlap with each other. In the case of the approximate combined performance model for the M-dimensional combined workload type, each of the variables (workload values) are divided by (M−1).

The data analyzing unit 103 models differential data between the combined performance data acquired by the data acquiring unit 102 and the approximate combined performance data acquired on the basis of the approximate combined performance model estimated by the model estimating unit 105 to generate a differential data model for the combined workload type. This generated differential data model corresponds to the difference between the approximate combined performance model and the actual combined performance model.

The model generating unit 104 uses the approximate combined performance model estimated by the model estimating unit 105 and the differential data model generated by the data analyzing unit 103 to generate the combined performance model for the combined workload type. The model generating unit 104 generates the combined performance model for the combined workload type, for example, by adding up the approximate combined performance model and the differential data model.

For example, the combined performance model M2CPU_CPU_NWSEND ( ) for the two-dimensional combined workload type for evaluating the CPU performance can be expressed by the following equation. In this exemplary embodiment, an example of the two-dimensional combined workload type formed by combining the single workload type of the CPU and the single workload type of the network transmission is given.

$$\text{M2CPU\_CPU\_NWSEND(WL\_CPU,WL\_NWSEND)} = \text{M2CPU\_CPU\_NWSEND~(WL\_CPU,WL\_NWSEND)} + \text{M2CPU\_DIFF\_CPU\_NWSEND(WL\_CPU,WL\_NWSEND)}$$

M2CPU_DIFF_CPU_NWSEND(WL_CPU, WL_NWSEND) in the above-described equation represents a differential data model generated by the data analyzing unit 103 and concerning the two-dimensional combined workload type formed by combining the single workload type related to the CPU and the single workload type related to the network transmission.

Example of Operation

Figure 7:
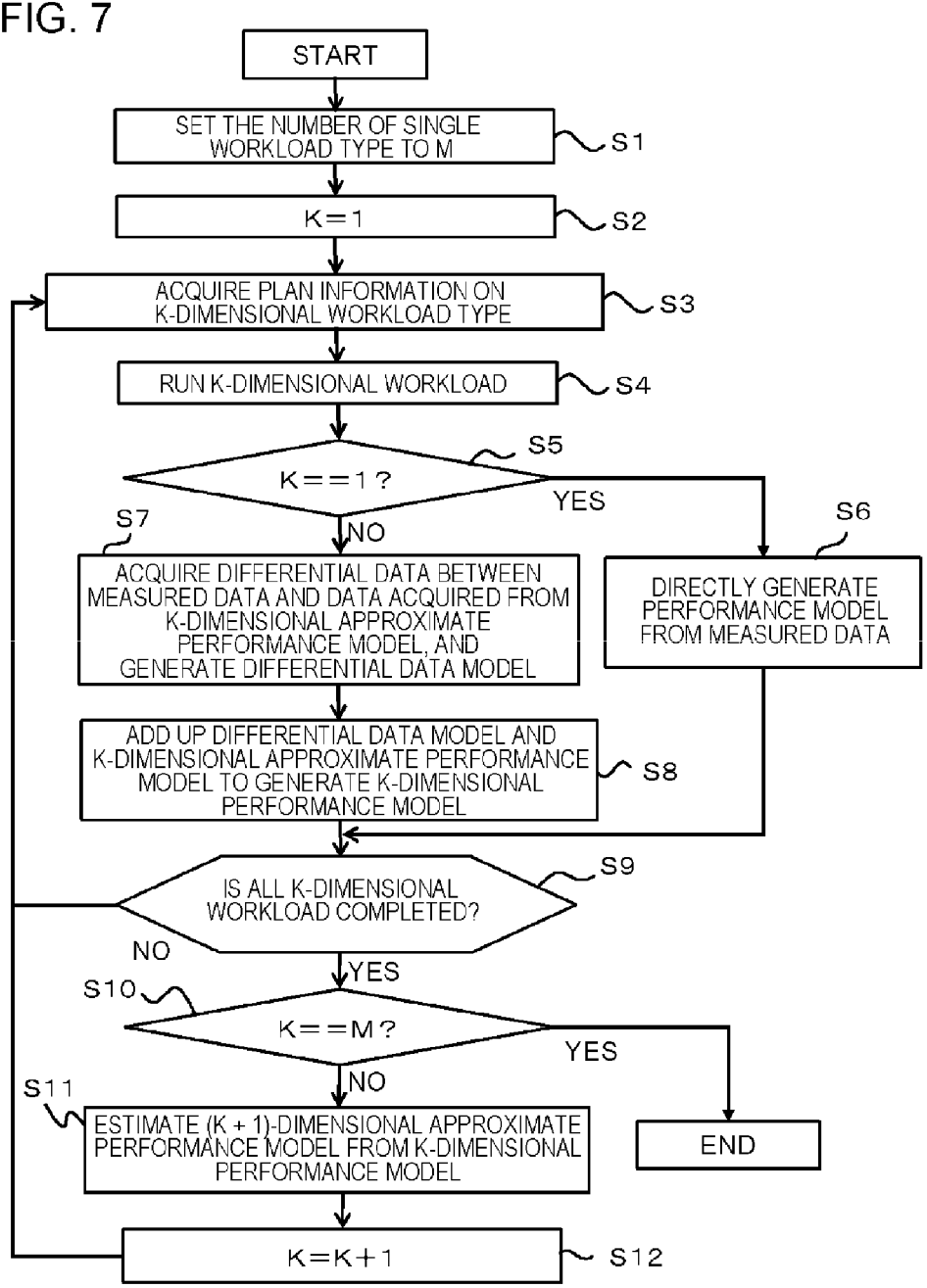
FIG. 7 is a flowchart showing an example of an operation performed by a performance evaluation system according to the second exemplary embodiment.

FIG. 7 is a flowchart showing an example of an operation performed by the performance evaluation system 1 according to the second exemplary embodiment. In the description below, an example of an operation will be given in which the CPU performance of the server device 20 is the target of evaluation. The computer resource of the server device 20 to be evaluated may be set in the performance evaluation device 10 in advance, or may be configured to be inputted by a user. The following example of an operation can be applied not only to the case where the evaluation target is set to the CPU performance, but also to the case where the evaluation target is set to performances of other computer resources, in other words, to the network performance, the hard disk access performance, the graphic performance and the like.

In the performance evaluation device 10, at the time of generating the performance model, the workload controlling unit 101 acquires information on the single workload type to be used. For example, the workload controlling unit 101 acquires this information from the workload plan file. Note that, in the case where three single workload types concerning the CPU, the network transmission, and the hard disk writing are used, the workload controlling unit 101 sets the number M of the single workload types to be used to three, and sets the variable K to one (S1, S2).

The workload controlling unit 101 selects one single workload type from among M pieces of the single workload types, and acquires the workload plan information concerning the selected single workload type (S3). For example, the workload controlling unit 101 acquires this workload plan information from the workload plan file as illustrated in FIG. 4 and FIG. 5.

The workload controlling unit 101 orders the server device 20 to run plural workloads concerning the selected single workload type on the basis of the acquired workload plan information. In this order, the workload plan information may be contained.

In the server device 20, the workload generating unit 201 receives the order, and runs the workload in accordance with the order (S4). In the example illustrated in FIG. 4, the CPU workload with the workload value (V_CPU(0)) is run for 60 seconds, and then, the CPU workload with the workload value (V_CPU(1)) is run for 60 seconds. With the example illustrated in FIG. 4, workloads corresponding to 21 pieces of workload values are sequentially run for 60 seconds.

At this time, in the server device 20, the data measuring unit 202 measures the performance data (primary performance data) indicating the CPU performance of the server device 20. In this exemplary embodiment, for example, the percentage of CPU used is measured as the primary performance data. The data measuring unit 202 transmits the measured primary performance data to the performance evaluation device 10.

In the performance evaluation device 10, the data acquiring unit 102 acquires the primary performance data transmitted from the data measuring unit 202 of the server device 20. In this exemplary embodiment, the acquired primary performance data indicates the performance of the workloads currently running and concerning the selected single workload type.

Then, the data analyzing unit 103 models the primary performance data acquired by the data acquiring unit 102 to generate the primary performance model corresponding to the selected single workload type (S5; YES, S6). At the time of this modeling, polynomial regression analysis is used for example. The primary performance model generated through this analysis is a polynomial formed by a value (objective variable) indicating performance and a workload value (explanatory variable) affecting this value, in other words, a polynomial regression model.

Although the workload controlling unit 101 completes generating the primary performance model for one single workload type, it does not complete processing all the single workload types (S9; NO). Thus, the workload controlling unit 101 selects the second single workload type, and acquires the workload plan information on the selected single workload type (S3).

After this, in a similar manner to that described above, the process of generating the primary performance models for the single workload types are repeated (S3, S4, S5; YES, S6) until M pieces of primary performance models for M pieces of single workload type are generated (S9; YES).

If the process of generating the primary performance models for all the single (K=1) workload types is completed (S9; YES, S10; NO), the model estimating unit 105 adds up two combinations from among the M pieces of the generated primary performance models to estimate the two-dimensional approximate combined performance model (S11). Here, the number of the estimated (K+1)-dimensional approximate combined performance model is indicated by $_MC_{(K+1)}$. This C represents a combination. In the case where three single workload types are used, three pieces of two-dimensional approximate combined performance models are generated (M=3 and K=1).

For example, in the case where three single workload types related to the CPU, the network transmission, and writing to the hard disk are used, estimation is made of: the two-dimensional approximate combined performance model formed by adding up the primary performance model related to the CPU and the primary performance model related to the network transmission; the two-dimensional approximate combined performance model formed by adding up the primary performance model related to the CPU and the primary performance model related to writing to the hard disk; and the two-dimensional approximate combined performance model formed by adding up the primary performance model related to the network transmission and the primary performance model related to writing to the hard disk.

After the model estimating unit 105 forms the two-dimensional approximate combined performance model, one is added to the variable K (S12). Then, the workload controlling unit 101 acquires the workload plan information on the two-dimensional combined workload type (S3). For example, this workload plan information is acquired from the workload plan file as illustrated in FIG. 6.

The workload controlling unit 101 orders the server device 20 to run the two-dimensional combined workload in accordance with the acquired plan information. In the server device 20, the workload generating unit 201 runs the two-dimensional combined workload in accordance with the order (S4). More specifically, the workload generating unit 201 runs, in parallel, two workloads corresponding to the combined workload type as ordered.

At this time, the data measuring unit 202 measures the performance data (combined performance data) on the two-dimensional combined workload currently running in the server device 20. The combined performance data on the measured two-dimensional combined workload currently running can be acquired from the data acquiring unit 102 of the performance evaluation device 10.

Then, the data analyzing unit 103 applies the workload value of each of the workloads constituting the combined workloads corresponding to the acquired combined performance data to the two-dimensional approximate combined performance model that has been already estimated by the model estimating unit 105, thereby acquiring each of the approximate combined performance data. The data analyzing unit 103 models the differential data between the combined performance data acquired by the data acquiring unit 102 and the acquired approximate combined performance data, thereby generating the differential data model (S5; NO, S7). In this modeling, for example, the polynomial regression analysis is used in a similar manner to that described above.

Then, the model generating unit 104 adds up the approximate combined performance model that has been already estimated by the model estimating unit 105 and the differential data model generated by the data analyzing unit 103, thereby generating the combined performance model corresponding to the two-dimensional combined workload type (S8). This adding up of the models is performed, for example, in a form of adding of the polynomials.

After this, in a similar manner described above, the process of generating the combined performance models for the two-dimensional combined workload types is repeated (S3, S4, S5; NO, S7, S8) until $_MC_2$ pieces of the two-dimensional performance models are generated (S9; YES).

If the process of generating the combined performance models for all the two-dimensional combined workload types is completed (S9; YES, S10; NO), the model estimating unit 105 adds up three combinations of the two-dimensional performance models from $_MC_2$ pieces of the two-dimensional performance models, thereby estimating the three-dimensional approximate combined performance model (S11). In the case where M is 3 and K is 2, one three-dimensional approximate combined performance model is generated.

It should be noted that, in the case where M is 2, the process ends without generating the three-dimensional approximate combined performance model as described above (S10; YES).

For example, in the case where three single workload types related to the CPU, the network transmission, and writing to the hard disk are used, estimation is made of the three-dimensional approximate combined performance model formed by adding up: the combined performance model of the two-dimensional combined workload type formed by combining the single workload type related to the CPU and the single workload type related to the network transmission; the combined performance model of the two-dimensional combined workload type formed by combining the single workload type related to the CPU and the single workload type related to writing to the hard disk; and the combined performance model of the two-dimensional combined workload type formed by combining the single workload type of the network transmission and the single workload type of writing to the hard disk.

After the model estimating unit 105 forms the three-dimensional approximate combined performance model, one is added to the variable K. Then, the workload controlling unit 101 acquires the workload plan information on the three-dimensional combined workload type (S3). After this, processes are performed in a similar manner to those for the two-dimensional combined workload type (S4, S5; NO, S7), and the combined performance model corresponding to the three-dimensional combined workload type is generated by using the three-dimensional approximate combined performance model (S8).

As described above, these processes are repeated until the combined performance model for the finally desired M-dimensional combined workload type is generated.

[Operation and Effect of Second Exemplary Embodiment]

As described above, the performance evaluation system 1 according to the second exemplary embodiment first generates the primary performance models for the single workload types. More specifically, plural workloads of each of the single workload types are sequentially performed on the server device 20 by the workload generating unit 201 for a predetermined period of time in response to control by the workload controlling unit 101, and performance data on the server device 20 currently running each of the workloads are measured by the data measuring unit 202.

The measured performance data are acquired by the data acquiring unit 102, and the data analyzing unit 103 models the plural items of performance data for each of the single workload types, thereby generating the primary performance model for each of the single workload types.

As described above, in the second exemplary embodiment, each of the primary performance models is generated on the basis of the plural items of the performance data corresponding to the plural workloads belonging to the same type and having different sizes. Here, with the increase in the number of workloads (the number of samples) generated in relation to the single workload type, more detailed performance data can be acquired, whereby the accuracy of the primary performance models generated increases.

Incidentally, since the combined workload for the combined performance model is formed by combining at least two different types of workloads, the number of samples of the combined workload significantly increases with the increase in the number of samples of the single workload type combined. In other words, in order to generate a highly accurate combined performance model, the period of time required for measurement generally becomes longer.

On the other hand, in the case where the number of samples is reduced to shorten the period of time required for measurement, the amount of performance data obtained also reduces, which results in deterioration in accuracy of the primary performance model and the combined performance model.

In view of the circumstances described above, the second exemplary embodiment employs the plural primary performance models generated as described above, thereby efficiently generating the combined performance models without causing a deterioration in the accuracy. Note that it is only necessary to set the number of samples for the primary performance model as described above to the normally set value in a manner such that accuracy of the primary performance model does not deteriorate.

In the second exemplary embodiment, if K is an integer more than or equal to 2, by adding up the K-dimensional approximate combined performance model and the differential data model, the K-dimensional performance model is generated (model generating unit 104).

The K-dimensional approximate combined performance model is estimated by adding up K pieces of combinations of performance models from among the plural (K−1)-dimensional performance models (model estimating unit 105). However, there is an error between the K-dimensional approximate combined performance model and the actual K-dimensional performance model, since the competing elements resulting from simultaneous running of K pieces of workloads are not considered.

In order to reduce this error, the second exemplary embodiment employs the differential data model generated by the data analyzing unit 103. The data analyzing unit 103 generates this differential data model by modeling the plural differential data between the performance data measured by the data measuring unit 202 and concerning the server device 20 currently running the K-dimensional combined workload and the approximate combined data obtained from the K-dimensional approximate combined performance model.

As described above, in the second exemplary embodiment, the substantial modeling process performed in generating the K-dimensional performance model is a process for forming the differential data model. The differential data model is less complex than that of the actual K-dimensional performance model. Thus, according to the second exemplary embodiment, it is possible to reduce the number of samples for generating the differential data model, in other words, to reduce the number of samples of the combined workload. This is because measurements need to be made with a larger number of measurement points in order to model the data indicating more complex distribution.

The reduction in the number of samples leads to a reduction in the time required for measurement. Thus, according to the second exemplary embodiment, by reducing the number of times of measurement, it is possible to efficiently generate the K-dimensional combined performance model. However, according to the second exemplary embodiment, it is possible to maintain the accuracy of the performance model even by reducing the number of times of measurement. This is because the modeling of the combined performance for the combined workload is converted into the modeling of the differential value between the approximate performance model and the real combined performance model, thereby reducing the complexity of the target to be modeled.

Third Exemplary Embodiment

In a third exemplary embodiment, an example is given in which the server device 20 to be evaluated in the exemplary embodiments described above can provide virtual machine environment. Below, the third exemplary embodiment will be described with focus being placed on things different from those in the exemplary embodiments described above.

Figure 8:
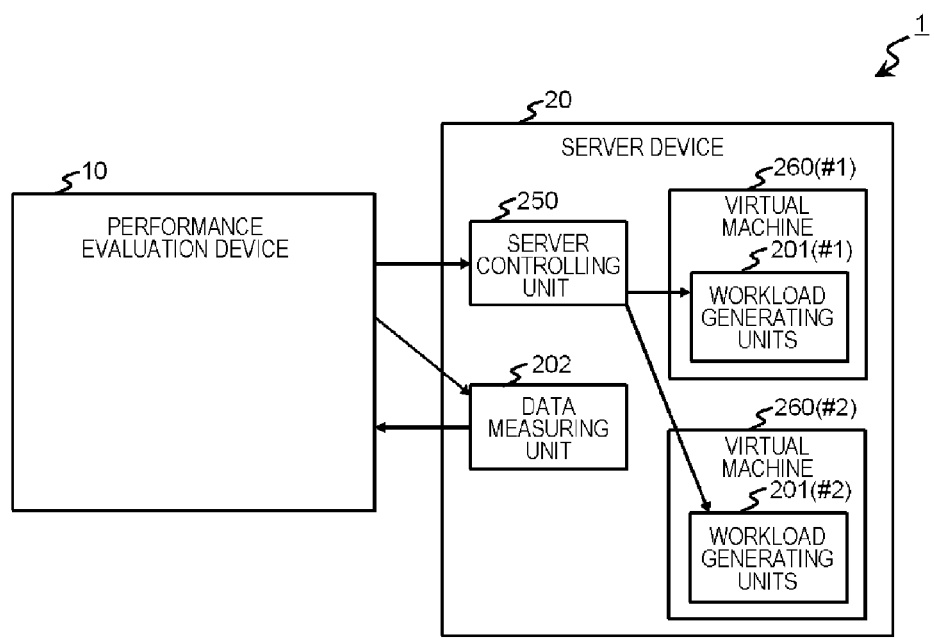
FIG. 8 is a schematic view illustrating an example of a process configuration of a server device according to a third exemplary embodiment.

FIG. 8 is a schematic view illustrating an example of a process configuration of the server device 20 according to the third exemplary embodiment. In addition to the configurations of the first exemplary embodiment and the second exemplary embodiment, the server device 20 according to the third exemplary embodiment further includes plural virtual machines 260 (#1) and 260 (#2), and a server controlling unit 250. The virtual machines are realized with general methods.

In the server device 20 according to the third exemplary embodiment, the server controlling unit 250 controls the virtual machines 260 (#1) and 260 (#2), and realizes workload generating units 201 (#1) and 201 (#2) on the respective virtual machines 260 (#1) and 260 (#2) in accordance with the instruction from the workload controlling unit 101 of the performance evaluation device 10.

As with the first exemplary embodiment and the second exemplary embodiment, the workload generating units 201 (#1) and 201 (#2) generate workloads or combined workloads on the virtual machines 260 (#1) and 260 (#2).

The data measuring unit 202 measures performance data on the virtual machines 260 (#1) and 260 (#2), and performance data on the entire server device 20. With these measurements, the data acquiring unit 102 of the performance evaluation device 10 acquires the performance data on the virtual machines 260 (#1) and 260 (#2), and the performance data on the entire server device 20.

The process configuration of the performance evaluation device 10 is similar to that of the first exemplary embodiment and the second exemplary embodiment. However, in the third exemplary embodiment, in the case where workloads belonging to the same type are caused to run on different virtual machines, these workloads are treated as different workloads. More specifically, if two single workload types related to the CPU and the network transmission are used, processes are performed such that there are four single workload types: a CPU workload and a network transmission workload, which are caused to run on the virtual machine 260 (#1), and a CPU workload and a network transmission workload, which are caused to run on the virtual machine 260 (#2).

At the time of modeling in the data analyzing unit 103, the performance data on the virtual machines 260 (#1) and 260 (#2) acquired by the data acquiring unit 102, and the entire performance data are used. The primary performance model and the combined performance model are generated through a similar manner to that in the first exemplary embodiment and the second exemplary embodiment.

As described above, according to the third exemplary embodiment, it is possible to efficiently generate the performance model for each of the virtual machines without deteriorating the accuracy.

Modification Example

In the above-described exemplary embodiments, the performance models are sequentially generated in increasing order from the combined workload type having the smaller number of the workload types combined. This process is performed to increase the efficiency without deteriorating the accuracy of the performance models by reducing the complexity of the differential data model used for generating each dimensional performance model.

However, depending on the types of performance to be evaluated, elements concerning competition between different types of workloads may have a little effect on the accuracy of the performance models. In such a case, it may be possible to employ the following methods of generating the performance model, rather than the method of gradually generating the performance model as described in the previous exemplary embodiments.

First, it may be possible to employ a method of directly generating the final performance model with three or more dimensions using the primary performance model. In this method, K pieces of primary performance models are added up to estimate a K-dimensional approximate combined performance model; combined performance data on a K-dimensional combined workload currently running are measured; a differential data model is generated; the K-dimensional approximate combined performance model and the differential data model are added up, thereby generating the K-dimensional combined performance model.

In this method, for example, when a three-dimensional performance model is generated, competing elements occurring at the time of running a two-dimensional combined workload and competing elements occurring at the time of running a three-dimensional combined workload are not concerned. This results in a complex differential data model as compared with that in the above-described exemplary embodiments. Thus, it is preferable to increase the number of samples used for obtaining the differential data model as compared with that in the above-described exemplary embodiments. However, with this method, the period of time for measuring the combined workloads with intermediate dimensions is omitted, and thus, the amount of processes and the time required for measurement can be reduced as compared with those in the above-described exemplary embodiments.

Secondly, it may be possible to employ a method of using a performance model with (K−2) or less dimensions in addition to the (K−1)-dimensional performance model when estimating a K-dimensional approximate combined performance model. More specifically, for example, it may be possible to add up a two-dimensional performance model and a primary performance model, thereby generating a three-dimensional approximate combined performance model. Note that, as in the first method, in this method, there exists a competing element that is not taken into account, and thus, the differential data model is more complex as compared with that in the above-described exemplary embodiments.

It should be noted that the exemplary embodiments have been described with reference to plural flowcharts, and plural steps (processes) are described in a sequential order. However, the order of the description of the steps does not necessarily limit the order of the process steps performed in the exemplary embodiments. In the exemplary embodiments, the order of the process steps illustrated in the drawings may be exchanged, provided that this exchange does not impair the details of the processes. The above-described exemplary embodiments and the modification examples may be combined, provided that the details thereof do not contradict each other.

Part or all of the exemplary embodiments and the modification examples can be described in a manner illustrated in the Supplemental Notes below. However, the exemplary embodiments and the modification examples are not limited to the descriptions below.

[Supplemental Note 1]

A performance evaluation device including:

a workload controlling unit that sequentially generates, for each of plural single workload types, plural workloads having different sizes on an evaluation target computer, and sequentially generates, for a combined workload type formed by combining at least two different single workload types, plural combined workloads formed by combining different types of workloads corresponding to the combined workload type on the evaluation target computer, a data acquiring unit that acquires primary performance data on the evaluation target computer currently running each of the workloads, and combined performance data on the evaluation target computer currently running each of the combined workloads;

a data analyzing unit that models the primary performance data acquired by the data acquiring unit to generate a primary performance model corresponding to each of the single workload types; and a model generating unit that generates a combined performance model corresponding to the combined workload type on the basis of the combined performance data acquired by the data acquiring unit and the primary performance model generated by the data analyzing unit.

[Supplemental Note 2]

The performance evaluation device according to Supplemental Note 1, in which the workload controlling unit sets the number of the combined workloads generated in relation to the combined workload type to be lower than the number of all the combinations of the workloads running in relation to each of the single workload types constituting the combined workload type.

[Supplemental Note 3]

The performance evaluation device according to Supplemental Note 1 or 2, in which the model generating unit includes a model estimating unit that estimates an approximate combined performance model corresponding to the combined workload type by using at least one primary performance model generated by the data analyzing unit to, the data analyzing unit models differential data between the combined performance data acquired by the data acquiring unit and approximate combined performance data obtained from the approximate combined performance model estimated by the model estimating unit to generate a differential data model corresponding to the combined workload type, and the model generating unit generates the combined performance model corresponding to the combined workload type by using the approximate combined performance model estimated by the model estimating unit and the differential data model generated by the data analyzing unit.

[Supplemental Note 4]

The performance evaluation device according to Supplemental Note 3, in which the model estimating unit estimates an approximate combined performance model corresponding to a K-dimensional combined workload type formed by combining K pieces of different workload types by using a (K−1)-dimensional performance model that is generated by the model generating unit and corresponds to a (K−1)-dimensional combined workload type formed by combining different (K−1) pieces (K is an integer more than or equal to 3) of workload types.

[Supplemental Note 5]

The performance evaluation device according to any one of Supplemental Notes 1 to 4, in which the workload controlling unit generates all of the workloads related to all of the single workload types, and then, generates the combined workloads in increasing order from the combined workload types having the smaller number of the workload types combined.

[Supplemental Note 6]

A performance evaluation method performed by a computer, the method including:

sequentially generating plural workloads having different sizes and related to each of plural single workload types on an evaluation target computer;

acquiring primary performance data on the evaluation target computer currently running each of the workloads;

sequentially generating, for a combined workload type formed by combining at least two different single workload types, plural combined workloads formed by combining different types of workloads corresponding to the combined workload type on the evaluation target computer;

acquiring combined performance data on the evaluation target computer currently running each of the combined workloads;

modeling the acquired primary performance data to generate a primary performance model corresponding to each of the single workload types; and generating a combined performance model corresponding to the combined workload type on the basis of the acquired combined performance data and the generated primary performance model.

[Supplemental Note 7]

The performance evaluation method according to Supplemental Note 6, in which the number of the combined workloads running in relation to the combined workload type is set lower than the number of the total combinations of the workloads running in relation to each of the single workloads types constituting the combined workload type.

[Supplemental Note 8]

The performance evaluation method according to Supplemental Note 6 or 7, in which said generating the combined performance model includes:

estimating an approximate combined performance model corresponding to the combined workload type by using at least one primary performance model generated;

generating a differential data model corresponding to the combined workload type by modeling differential data between the acquired combined performance data and approximate combined performance data obtained from the estimated approximate combined performance model; and generating the combined performance model corresponding to the combined workload type by using the estimated approximate combined performance model and the generated differential data model.

[Supplemental Note 9]

The performance evaluation method according to Supplemental Note 8, in which said estimating the approximate combined performance model includes estimating the approximate combined performance model corresponding to a K-dimensional combined workload type formed by combining K pieces of different workload types by using a generated (K−1)-dimensional performance model corresponding to a (K−1)-dimensional combined workload type formed by combining different (K−1) pieces (K is an integer more than or equal to 3) workload types.

[Supplemental Note 10]

The performance evaluation method according to any one of Supplemental Notes 6 to 9, in which said generating the workloads generates all of the workloads concerning each of the single workload types, and then, generates the combined workloads in increasing order from the combined workload types having the smaller number of workload types combined.

[Supplemental Note 11]

A performance evaluation program that causes a computer to realize:

a workload controlling unit that sequentially generates, for each of plural single workload types, plural workloads having different sizes on an evaluation target computer, and sequentially generates, for a combined workload type formed by combining at least two different single workload types, plural combined workloads formed by combining different types of workloads corresponding to the combined workload type on the evaluation target computer;

a data acquiring unit that acquires primary performance data on the evaluation target computer currently running each of the workloads, and combined performance data on the evaluation target computer currently running each of the combined workloads;

a data analyzing unit that models the primary performance data acquired by the data acquiring unit to generate a primary performance model corresponding to each of the single workload types; and a model generating unit that generates a combined performance model corresponding to the combined workload type on the basis of the combined performance data acquired by the data acquiring unit and the primary performance model generated by the data analyzing unit.

[Supplemental Note 12]

The performance evaluation program according to Supplemental Note 11, in which the workload controlling unit sets the number of the combined workloads running in relation to the combined workload type to be lower than the number of all the combinations of the workloads running in relation to each of the single workload types constituting the combined workload type.

[Supplemental Note 13]

The performance evaluation program according to Supplemental Note 11 or 12, in which the model generating unit includes a model estimating unit that uses at least one primary performance model generated by the data analyzing unit to estimates an approximate combined performance model corresponding to the combined workload type, the data analyzing unit models differential data between the combined performance data acquired by the data acquiring unit and approximate combined performance data obtained from the approximate combined performance model estimated by the model estimating unit to generate a differential data model corresponding to the combined workload type, and the model generating unit generate the combined performance model corresponding to the combined workload type by using the approximate combined performance model estimated by the model estimating unit and the differential data model generated by the data analyzing unit.

[Supplemental Note 14]

The performance evaluation program according to Supplemental Note 13, in which the model estimating unit estimates an approximate combined performance model corresponding to a K-dimensional combined workload type formed by combining K pieces of different workload types by using a (K−1)-dimensional performance model that is generated by the model generating unit and corresponds to a (K−1)-dimensional combined workload type formed by combining (K−1) pieces (K is an integer more than or equal to 3) of different workload types.

[Supplemental Note 15]

The performance evaluation program according to any one of Supplemental Notes 11 to 14, in which the workload controlling unit generates all the workloads related to each of the single workload types, and then, generates the combined workloads in increasing order from the combined workload type having the smaller number of the workload types combined.

[Supplemental Note 16]

A performance evaluation system including:

the performance evaluation device according to any one of Supplemental Notes 1 to 5; and the evaluation target computer including:

a workload generating unit that runs each of the workloads and the combined workload at different timings in accordance with control performed by the workload controlling unit; and a data measuring unit that measures the primary performance data on each of the workloads currently running and the combined performance data on the combined workload currently running.

[Supplemental Note 17]

A computer-readable storage medium that records the performance evaluation program according to any one of Supplemental Notes 11 to 15.

The present application claims priority based on Japanese Patent Application No. 2011-001467 filed in Japan on Jan. 6, 2011, the disclosures of which are incorporated herein by reference in their entirety.

The invention claimed is:

1. A performance evaluation device comprising:
a workload controlling unit that sequentially generates, for each of a plurality of single workloads types, a plurality of workloads having different sizes on an evaluation target computer, and sequentially generates, for a combined workload type formed by combining at least two different single workload types, a plurality of combined workloads formed by combining different types of workloads corresponding to the combined workload type on the evaluation target computer;
a data acquiring unit that acquires primary performance data on the evaluation target computer currently running each of the workloads, and combined performance data on the evaluation target computer currently running each of the combined workloads;
a data analyzing unit that models the primary performance data acquired by the data acquiring unit to generate a primary performance model corresponding to each of the single workload types; and
a model generating unit that generates a combined performance model corresponding to the combined workload type based on the combined performance data acquired by the data acquiring unit and the primary performance model generated by the data analyzing unit.

2. The performance evaluation device according to claim 1, wherein
the workload controlling unit sets a number of the combined workloads generated in relation to the combined workload type to be lower than a number of all the combinations of the workloads of the single workload types constituting the combined workload type.

3. The performance evaluation device according to claim 1, wherein
the model generating unit includes a model estimating unit that estimates an approximate combined performance model corresponding to the combined workload type by using at least one primary performance model generated by the data analyzing unit,
the data analyzing unit models differential data between the combined performance data acquired by the data acquiring unit and approximate combined performance data obtained from the approximate combined performance model estimated by the model estimating unit to generate a differential data model corresponding to the combined workload type, and
the model generating unit generates the combined performance model corresponding to the combined workload type by using the approximate combined performance model estimated by the model estimating unit and the differential data model generated by the data analyzing unit.

4. The performance evaluation device according to claim 3, wherein
the model estimating unit estimates the approximate combined performance model corresponding to a K-dimensional combined workload type formed by combining K pieces of different workload types by using a (K−1)-dimensional performance model that is generated by the model generating unit and corresponds to a (K−1)-dimensional combined workload type formed by combining different (K−1) pieces (K is an integer more than or equal to 3) of workload types.

5. The performance evaluation device according to claim 1, wherein
the workload controlling unit generates all of the workloads related to all of the single workload types, and then, generates the combined workloads in order of increasing a number of the workload types combined.

6. A performance evaluation method performed by a computer, the method including:
sequentially generating, for each of a plurality of single workload types, a plurality of workloads having different sizes on an evaluation target computer;
acquiring primary performance data on the evaluation target computer currently running each of the workloads;
sequentially generating, for a combined workload type formed by combining at least two different single workload types, plural combined workloads formed by combining different types of workloads corresponding to the combined workload type on the evaluation target computer;
acquiring combined performance data on the evaluation target computer currently running each of the combined workloads;
modeling the acquired primary performance data to generate a primary performance model corresponding to each of the single workload types; and
generating a combined performance model corresponding to the combined workload type based on the acquired combined performance data and the generated primary performance model.

7. The performance evaluation method according to claim 6, wherein a number of the combined workloads of the combined workload type is set lower than a number of total combinations of the workloads of the single workloads types constituting the combined workload type.

8. The performance evaluation method according to claim 6, wherein
said generating the combined performance model includes:
estimating an approximate combined performance model corresponding to the combined workload type by using at least one primary performance model generated;
generating a differential data model corresponding to the combined workload type by modeling differential data between the acquired combined performance data and approximate combined performance data obtained from the estimated approximate combined performance model; and
generating the combined performance model corresponding to the combined workload type by using the estimated approximate combined performance model and the generated differential data model.

9. The performance evaluation method according to claim 8, wherein
said estimating the approximate combined performance model includes estimating the approximate combined performance model corresponding to a K-dimensional combined workload type formed by combining K pieces of different workload types by using a generated (K−1)-dimensional performance model corresponding to a (K−1)-dimensional combined workload type formed by combining different (K−1) pieces (K is an integer more than or equal to 3) workload types.

10. The performance evaluation method according to claim 6, wherein said generating the workloads generates all of the workloads concerning each of the single workload types, and then, generates the combined workloads in order of increasing a number of workload types combined.

11. A non-transitory computer-readable storage medium storing a performance evaluation program for causing a computer to realize:
- a workload controlling unit that sequentially generates, for each of a plurality of single workload types, a plurality of workloads having different sizes on an evaluation target computer, and sequentially generates, for a combined workload type formed by combining at least two different single workload types, a plurality of combined workloads formed by combining different types of workloads corresponding to the combined workload type on the evaluation target computer;
- a data acquiring unit that acquires primary performance data on the evaluation target computer currently running each of the workloads, and combined performance data on the evaluation target computer currently running each of the combined workloads;
- a data analyzing unit that models the primary performance data acquired by the data acquiring unit to generate a primary performance model corresponding to each of the single workload types; and
- a model generating unit that generates a combined performance model corresponding to the combined workload type based on the combined performance data acquired by the data acquiring unit and the primary performance model generated by the data analyzing unit.

12. The non-transitory computer-readable storage medium according to claim 11, wherein
the workload controlling unit sets a number of the combined workloads of the combined workload type to be lower than a number of all the combinations of the workloads of the single workload types constituting the combined workload type.

13. The non-transitory computer-readable storage medium according to claim 11, wherein
the model generating unit includes a model estimating unit that uses at least one primary performance model generated by the data analyzing unit to estimates an approximate combined performance model corresponding to the combined workload type,
the data analyzing unit models differential data between the combined performance data acquired by the data acquiring unit and approximate combined performance data obtained from the approximate combined performance model estimated by the model estimating unit to generate a differential data model corresponding to the combined workload type, and
the model generating unit generate the combined performance model corresponding to the combined workload type by using the approximate combined performance model estimated by the model estimating unit and the differential data model generated by the data analyzing unit.

14. The non-transitory computer-readable storage medium according to claim 13, wherein
the model estimating unit estimates the approximate combined performance model corresponding to a K-dimensional combined workload type formed by combining K pieces of different workload types by using a (K−1)-dimensional performance model that is generated by the model generating unit and corresponds to a (K−1)-dimensional combined workload type formed by combining (K−1) pieces (K is an integer more than or equal to 3) of different workload types.

15. The non-transitory computer-readable storage medium according to claim 11, wherein
the workload controlling unit generates all the workloads related to each of the single workload types, and then, generates the combined workloads in order of increasing a number of the workload types combined.

* * * * *